United States Patent [19]

Egli et al.

[11] Patent Number: 4,637,723

[45] Date of Patent: Jan. 20, 1987

[54] DISCRIMINANT APPARATUS FOR RING LASER ANGULAR RATE SENSORS

[75] Inventors: Werner H. Egli, Minneapolis; Mark W. Weber, Elk River, both of Minn.

[73] Assignee: Honeywell Inc., Minneapolis, Minn.

[21] Appl. No.: 430,052

[22] Filed: Sep. 30, 1982

[51] Int. Cl.[4] .......................... G01B 9/02; H01S 3/083
[52] U.S. Cl. ........................................ 356/350; 372/94
[58] Field of Search ............................ 356/350; 372/94

[56] References Cited

U.S. PATENT DOCUMENTS

| | | | |
|---|---|---|---|
| 3,373,650 | 3/1968 | Killpatrick | 356/350 |
| 3,390,606 | 7/1968 | Podgorski | 372/94 |
| 3,467,472 | 9/1969 | Killpatrick | 356/350 |
| 4,152,071 | 5/1979 | Podgorski | 356/350 |
| 4,320,974 | 3/1982 | Ljung | 356/350 |
| 4,422,762 | 12/1983 | Hutchings et al. | 356/350 |

FOREIGN PATENT DOCUMENTS 2454100  12/1980  France ............................ 356/350

*Primary Examiner*—Stephen C. Buczinski
*Attorney, Agent, or Firm*—Robert A. Pajak

[57] ABSTRACT

In the present application, a discriminant apparatus for a ring laser angular rate sensor is described which provides a discriminant signal indicative of the lock-in rate of the sensor derived from the phase difference between the counter-propagating waves therein. The discriminant signal may be employed in a closed-loop control signal system for altering the coupling of energy between the counter-propagating waves in a ring laser angular rate sensor for controlling the value of the lock-in rate to a minimum rate.

25 Claims, 4 Drawing Figures

DISCRIMINANT APPARATUS FOR RING LASER ANGULAR RATE SENSORS

The present invention relates to angular rate sensors, and more particularly to a discriminant apparatus for providing an output signal related to the lock-in rate phenomena of ring laser angular rate sensors. Further, the present invention discloses an apparatus which makes use of a discriminant signal indicative of the lock-in rate for affecting the lock-in rate of a ring laser angular rate sensor.

Ring laser angular rate sensors are illustrated and described in U.S. Pat. Nos. 4,152,071 and 3,390,606, by Podgorski, and U.S. Pat. Nos. 3,373,650 and 3,467,472, by Killpatrick, all of which are assigned to the assignee of the present invention.

In the class of ring laser angular rate sensors, two monochromatic waves are generated to travel in opposite directions along an optical closed-loop path. The monochromatic waves are usually in the form of two laser beams. Rotation of the optical closed-loop path causes the effective path length traveled by the waves to change. Since the optical closed-loop path forms a resonant cavity providing sustained oscillations of the waves therein, the wave length of each of the waves will change, one increasing, the other decreasing as a result of rotation of the closed-loop path. Angular rotation of the closed-loop path, therefore, causes a frequency differential to occur between the two waves, which frequency differential is proportional to the rate of angular rotation.

One example of a ring laser angular rate sensor is shown and described in U.S. Pat. Nos. 3,390,606 and 4,152,071 as aforesaid. The ring laser sensor shown therein includes a substantially thermally and mechanically stable block which forms a triangular shaped ring laser cavity defined by a mirror at each of the corners thereof. The cavity is filled by a gas which comprises, for example, helium and neon gas. In accordance with prior art practice, one of the corner mirrors is somewhat transmissive for allowing a portion of each of the counter-traveling waves or beams to be extracted from the laser cavity so as to be heterodyned in a beam combiner to produce an interference pattern. The interference pattern is detected by a photodetector which senses the beat frequency of the heterodyned optical frequencies of the two beams which is a measure of the angular rotation rate. The photodetector output signal is indicative of the sine function of the instantaneous phase difference between the waves from which the rate of change in phase may also be determined. This is so, since the frequency of the waves establishes a phase difference between the waves. When there exists a frequency differential between the waves, the phase difference changes continuously. The rate of change in phase being related to the rotation rate, and the change in phase is related to an angular rotation change.

The phenomenon commonly associated with ring laser angular rate sensors is known as "lock-in." Lock-in is the situation where the rate of rotation of the optical closed-loop path is below a critical value known as the "lock-in rate" below which the two waves oscillate at only one frequency. The lock-in phenomenon is thought to be caused by coupling of energy between the waves, the dominant source being backscattering at the mirror surfaces. Other contributors to the coupling of energy include, among others, aperture affects and the gas medium itself.

In order to obviate the effects of lock-in at low rotation rates, the sensor may be biased in such a manner so that the device is kept out of lock-in for a majority of time. One biasing scheme is shown in U.S. Pat. No. 3,373,650 which provides a means for varying the frequency difference so that a frequency difference exists for a majority of the time. This biasing technique is commonly known as dithering. Dithering may be provided by rotationally oscillating the sensor back and forth, and may also be provided by affecting the counter-propagating waves by optically altering the waves to provide a dithering bias. Another scheme for biasing a ring laser angular rate sensor is to rotate the sensor well above the lock-in rate. This technique too, has an optical counterpart whereby the frequencies of the waves are separated sufficiently so that a frequency difference exists in the presence of low rotation rates.

The above biasing techniques do not totally eliminate the effects of lock-in since there always exists some coupling of energy between the counter-propagating waves. Particularly, in a dithered ring laser angular rate sensor, the rate of rotation of the closed-loop path goes through zero at the extremities of each oscillation, i.e. the turnaround. At these turnaround points, an accumulation of lock-in error exists in the typical gyro output. The accumulation of lock-in error is known in the art as random drift. U.S. Pat. No. 4,152,071 provided an apparatus to alter the lasing path of the counter-propagating waves so as to obtain a reduced lock-in rate for an individual sensor. By optimizing or minimizing the value of the lock-in rate, the amount of random drift or lock-in error is also minimized. It should also be noted that the sensor scale factor in constant rate biased systems is also related to sensor lock-in rate. In U.S. Pat. No. 4,152,071, the portion of one of the waves transmitted through one of the mirrors was utilized to obtain a discriminant signal indicative of the lock-in rate. It was taught in the U.S. Pat. No. 4,152,071 that intensity variations of either wave was indicative of the lock-in rate.

SUMMARY OF THE INVENTION

In the present application, a discriminant apparatus for a ring laser angular rate sensor is described which provides a discriminant signal indicative of the lock-in rate of the sensor derived from the phase difference between the counter-propagating waves therein. The discriminant signal may be employed in a closed-loop control signal system for altering the coupling of energy between the counter-propagating waves in a ring laser angular rate sensor for controlling the value of the lock-in rate to a minimum rate.

Specifically, in the present application, a portion of the counter-propagating waves are heterodyned in order to produce an interference pattern. The interference pattern is detected to provide a signal which is processed in such a way so as to obtain a relative measurement of "phase jitter" observable in the interference pattern which is related to the lock-in rate of the sensor system.

DETAILED DESCRIPTION OF THE INVENTION

Figure 1A:
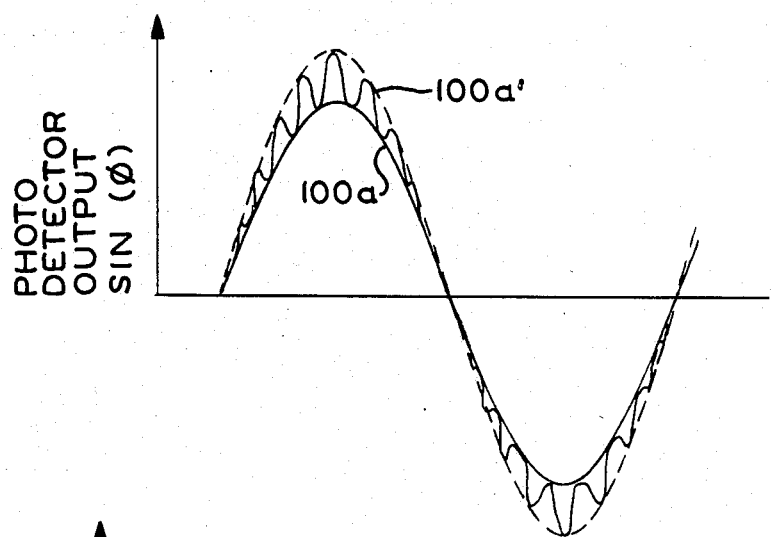
FIG. 1a is a graphical representation of an interference pattern exhibiting amplitude jitter.

One scheme for detecting rate information from a ring laser angular rate sensor is shown and described in U.S. Pat. No. 3,373,650, and specifically in FIG. 2 and FIG. 3 of the aforementioned patent. The scheme employed is such that an optical system is rigidly fixed to a base. A support provides a ring laser structure which is coupled to the base through a spring means. The support and ring laser structure are rotatably oscillated relative to the base in a manner well-known in the art to provide a mechanical dithering bias. A portion of each of the counter-propagating waves is projected from the laser structure toward the optical system fixed to the base. The optical system includes a photodetector for monitoring an interference pattern, produced by the optical system, related to the phase difference between the counter-propagating waves therein. In such an optical system and detector scheme, the inertial base motion, that is, rotation of both the base and the laser structure is detected and monitored by the optical system employed. The rotational oscillations of the ring laser structure relative to the base are substantially removed so that the detector does not substantially observe or respond to rotational oscillations caused by a mechanical dithering bias mechanism. Nevertheless, some spillover of the bias induced rotational oscillations does exist in the output of the detector as will be further explained.

Before proceeding with a detailed explanation of the invention, it is helpful in the understanding of this invention to present some principles of behavior of a ring laser angular rate sensor which are substantially described in a publication entitled, "Lock-In and Intensity-Phase Interaction in the Ring Laser," by Frederick Aronowitz and R. J. Collins, Journal of Applied Physics, Volume 41, No. 1, 130–141, January 1970, and a publication by Aronowitz and Lim, entitled "Positive Scale Factor Correction in the Laser Gyro," IEEE of Journal of Quantum Electronics, Vol. QE-13, No. 5, May 1977. Equation (1), below, sets forth the well-known lock-in equation explained therein.

$$\dot{\psi} = \Omega_{in} + \Omega_L \sin(\psi + \delta) \tag{1}$$

Equation (1) indicates that in the presence of rotation, the value of the rate of change of the phase difference will be phase modulated as a function of the sine function of the phase angle scaled by the lock-in rate. Another way of stating the same, the rate of change of phase difference between the propagating waves will vacillate at the beat frequency, i.e. the frequency difference between the counter-propagating waves. This phenomenon is herein referred to as "phase jitter."

At the same time, there exists an interaction between the counter-propagating waves which amplitude modulates the intensity of each of the waves in a manner dependent upon the phase relationship of any coupling of energy between the waves. This is particularly demonstrated by the phenomena known as "winking." This phenomena is referred to herein as "amplitude jitter."

Although amplitude jitter and phase jitter are produced as the result of the lock-in phenomena, namely coupling of energy between the waves, the value or magnitude of the amplitude jitter is not as direct of a measurement of lock-in rate as is the phase jitter which is directly related to the lock-in rate. In the following discussion, a description of how phase jitter and amplitude jitter shows up in the normal detection scheme of a ring laser angular rate sensor is presented.

Consider the configuration of a rotationally dithered ring laser angular rate sensor as described above where the optical system is rigidly attached to the base, and the laser structure is dithered relative to the base. In this situation, the interference pattern produced by the optical system would change at a rate proportional to common rotational motion to both the laser structure and the base—inertial base motion. Dither motion of only the laser structure shows up only as a spillover component of the interference pattern as aforesaid—the spillover component being directly related to the phase difference between the counter-propagating waves of the sensor. The optical detection system and sensor configuration described above is sometimes referred to as a case mounted readout. The output of a single photodetector responsive to the interference fringe pattern produced by the optical system may be described as:

$$U = AI_1 + BI_2 + 2\sqrt{AB}\sqrt{I_1 I_2} \sin(\phi + x) \tag{2}$$

where
- A, B, are some unequal multiples of the propagating waves due to the detector output optics,
- $I_1$, $I_2$, are the intensities of the propagating waves,
- $\phi$ represents the time dependent phase difference between the propagating waves, but which, in case mounted readout sensors, substantially excludes dither motion, and
- "x" is the spatial separation corresponding to some reference relative to the projected interference pattern.

Now consider two detectors responsive to the same interference pattern but which are located by a spatial separation of ¼ of a fringe pattern spacing corresponding to $\pi/2$. These two detectors may have unequal sensitivities, but it is a trivial matter to compensate for this by an equalizer with electronic gain giving the following representations of the two detectors. The two detectors would have outputs represented by:

$$U_1 = AI_1 + BI_2 + 2\sqrt{ABI_1I_2} \sin(\phi + c) \tag{3}$$

and $$U_2 = AI_1 + BI_2 + 2\sqrt{ABI_1I_2} \sin(\phi + d) \tag{4}$$

Subtracting U1 and U2 yields:

$$V = K\sqrt{I_1'I_2'} \sin(\phi' + \alpha) \tag{5}$$

where the constants K and $\alpha$ are defined by:

$$K = 2\sqrt{2AB}(1 - \cos(c-d)) \tag{6}$$

$$\alpha = \arctan\left(\frac{\sin(c) - \sin(d)}{\cos(c) - \cos(d)}\right) \tag{7}$$

Lock-in effects will cause some amplitude modulation of the wave intensities or amplitudes $I_1$, and $I_2$, and will cause some phase modulation of the phase difference between the waves. It is the phase jitter or phase modulation which is needed to be detected so that lock-in can be minimized. Due to the lock-in effects as indicated earlier, the rotational oscillations will produce some spillover into the interference pattern resulting in jitter in both the amplitude, namely, $\sqrt{I_1 I_2}$ and in phase, namely $\phi$, at a frequency related to the actual rotation rate of the closed-loop path including bias. Thus equation (5) may be rewritten as follows:

$$V = K\sqrt{I_1 I_2} \{\sin \theta + J_1 \sin \theta + J_2 \cos \theta\} \quad (8)$$

where
$J_1 = $ amplitude jitter $= J_1 \sin (\psi + \epsilon_1)$
$J_2 = $ phase jitter $= J_2 \sin (\psi + \epsilon_2)$
since modulation of $I_1' I_2'$ and $\phi'$ may be expressed as:

$$\sqrt{I_1' I_2'} = \sqrt{I_1 I_2}[1 + \overline{J_1} \sin (\psi + \epsilon_1)] \text{ and}$$

$$\phi' = \phi + J_2 \sin (\psi + \epsilon_2)$$

$J_1$ represents the amplitude jitter and $J_2$ represents the phase jitter due to the lock-in effect. Equation (8) indicates that the output interference pattern includes substantially low frequency terms $\phi$ related to the sensor inertial base rotation rate, $\theta$, and the somewhat higher frequency terms $J_1$ and $J_2$ modulated by the inertial base rotation rate $\theta$ plus the dither, the total being represented by $\psi$. Equation (8) may be graphically demonstrated as shown in FIGS. 1a and 1b.

Figure 1B:
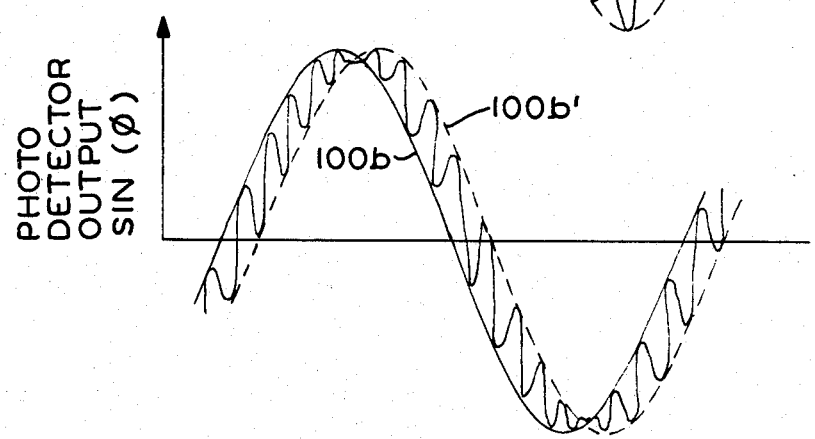
FIG. 1b is a graphical representation of an interference pattern exhibiting phase jitter.

FIG. 1a and FIG. 1b and curves 100a and 100b exemplify the output of one of the photodetectors of the optical system in response to the intensity of the interference pattern projected thereon. The vertical axis represents sin ($\phi$), which is the usual photodetector output. In the presence of some rotation rate, the sine of the angle $\phi$ will vary in a sinusoidal form since the intensity projected on the photodetector will vary in a sinusoidal manner. In the presence of only amplitude jitter, the interference pattern intensity and corresponding photodetector output will vary as shown by the intensity modulation between curve 100a and 100a' in FIG. 1a. On the other hand, in the presence of only phase jitter, curve 100b will vacillate between 100b and 100b', which are phase modulated, resulting in a variation in interference pattern intensity similar to intensity modulation.

It is important to note that though the amplitude jitter and phase jitter result in amplitude modulation of the interference pattern and accordingly the output of the photodetector, a measurement of the photodetector jitter does not provide, of itself, the difference between phase jitter and amplitude jitter. Nevertheless, FIG. 1a and FIG. 1b point out distinguishable characteristics of amplitude jitter and phase jitter which are useful in separating the two for discrimination purposes. Namely, that the maximum detector output amplitude modulation due to phase jitter occurs in a portion of the detector output between its maximum and minimum. On the other hand, the maximum amplitude modulation due to amplitude jitter occurs in a portion of the detector output about the detector's maximum and minimum. These maxima and minima correspond to maximum and minimum interference pattern intensities as observed by the photodetector. Thus, it is one of the principles of this invention to selectively obtain a relative value of the phase jitter during a portion of the output between the maximum and minimum. It must be pointed out, however, that the variation in the intensity between the minimum and maximum includes a component of amplituded jitter and therefore must be corrected to account for the contribution of amplitude jitter in the intensity of the interference pattern therebetween. Consider now the embodiment of the invention shown in FIG. 2.

Figure 2:
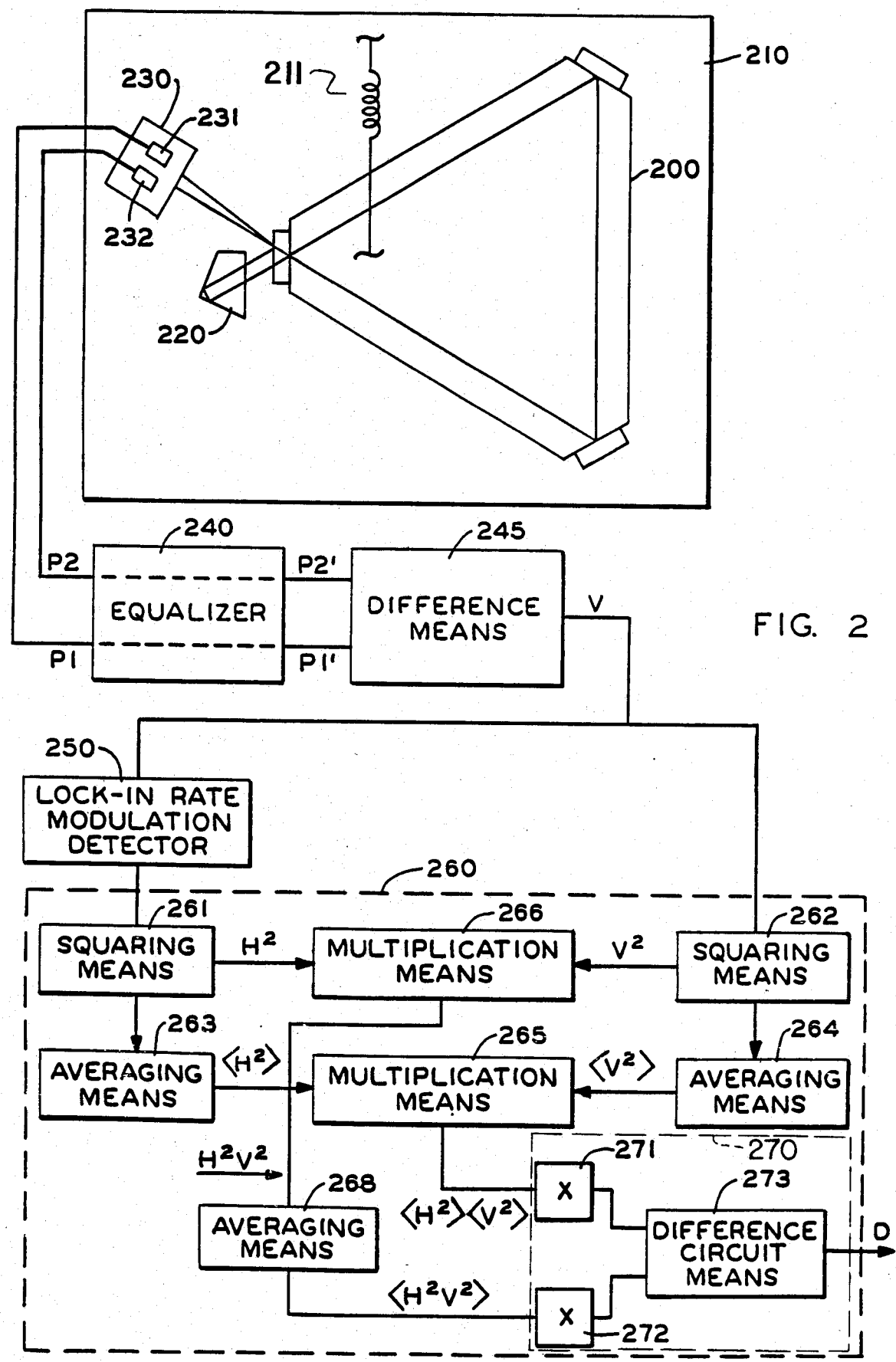
FIG. 2 is a general block diagram showing an embodiment of the invention.

Shown in FIG. 2 is laser gyro structure 200 suspended from a support means 210. An optical means 220 rigidly attached to base 210 is positioned in a manner relative to laser structure 200 so as to heterodyne a portion of each of the propagating waves traveling in a closed-loop path of laser structure 200 and project an interference pattern on detector 230. Detector 230 includes photodetectors 231 and 232 which are responsive to the interference pattern projected on detector 230. Laser structure 200, support means 210, optical means 220, and detector 230 are well known in the art and substantially shown and described in U.S. Pat. No. 3,373,650.

In order to reduce the effects of lock-in upon the performance of the sensor, laser structure 200 is rotationally dithered or oscillated relative to base 210 in a manner well-known in the art and is also shown and described in U.S. Pat. No. 3,373,650. In FIG. 2, laser structure 200 is shown coupled to the base through spring means 211 so that laser structure 200 may oscillate relative to base 210. In such a situation, the interference pattern produced on detector 230 is representative of the phase relationship between the counter-propagating waves but which is compensated for the dither induced rotational oscillations by optical means 220 being fixed to the base 210. Thus, detectors 231 and 232 will provide an output signal like that shown in FIG. 1a or 1b since the rate of change of the maxima and minima of the interference pattern projected on the face of detector 230 is indicative of inertial space rotation common to both base 210 and laser structure 200. As indicated earlier, detectors 231 and 232 will provide signal components related to the sum of amplitude jitter and phase jitter which is present in the observed interference pattern.

Each output of detector 231 and 232 indicated by the signals $P_1$ and $P_2$ is indicative of the phase relationship between the counter-propagating waves but which substantially excludes change in phase due to the rotational dither. Signals $P_1$ and $P_2$ are first fed through an equalizing circuit 240 for providing corresponding equalized intensity signals $P_1'$ and $P_2'$. Equalizer 240 may simply be an automatic gain circuit. The equalizer 240 simply provides a normalization function to compensate for different gain of the photodetectors as well as the optical system. Signals $P_1'$ and $P_2'$ in turn are fed to a difference circuit 245 providing an output signal designated as the primary signal V having properties substantially described by equation (8).

Signal V is first passed through a lock-in modulation detection means 250 providing an output signal which is designated signal H. Lock-in modulation detection means 250 may be provided by a high pass filter which passes signal V except the first bracketed term of equation (8) which is the normal variation in primary signal V due to desired inertial base motion. Therefore, signal H represents only the lock-in modulation of primary signal V resulting from both phase and amplitude jitter. Subsequently, signal H and signal V are presented as inputs to a signal processing circuit 260 which provides an output signal representative of the phase jitter representative of the lock-in rate of the sensor. Signal processing circuit 260 acts as a demodulator to extract phase jitter from the interference pattern which is contained in signal V.

In the embodiment shown in FIG. 2, the signal processor includes squaring means 261 which provides the function of squaring the lock-in modulation signal H. Signal processing circuit means also includes squaring means 262 which provides the function of squaring the primary signal V. Each of the outputs of squaring means 261 and 262 are passed through averaging circuits such as low pass filters 263 and 264. These provide output signals $<H^2>$ and $<V^2>$ which represent the average value of $H^2$ and $V^2$. In turn, the product of the average values of $H^2$ and $V^2$ is provided by multiplying means 265. The output of multiplying means 265 may be represented mathematically by:

$$<H^2><V^2> = \left(\frac{K^2 I_1 I_2 C^2}{8}\right)(J_1^2 + J_2^2) \quad (9)$$

where $$H^2 = C^2\{J_1^2 \sin^2\phi + J_2^2 \cos^2\phi\} \quad (10)$$

$$<H^2> = \frac{C^2}{2}\{<J_1^2> + <J_2^2>\} = \frac{C^2}{4}\{\bar{J}_1^2 + \bar{J}_2^2\} \quad (11)$$

since $<J_1^2> = <J_2^2> = \frac{1}{2}$, and $$<V^2> = \frac{K^2 I_1 I_2}{2} \quad (12)$$

Signal processing means 260 includes another signal path in which the product of the square of the lock-in modulation signal H and the square of the primary signal V is provided by multiplication means 266 having an output signal represented by:

$$V^2 H^2 = [K^2 I_1 I_2 \sin^2\phi][C^2(J_1^2 \sin^2\phi + J_2^2 \cos^2\phi)]$$

assuming that $<J_1 J_2 \sin\phi \cos\phi> = 0$

The output of multiplication means 266 is then passed through an averaging circuit 268, such as another low pass filter, which provides an output signal representative of the average of the product of $H^2$ and $V^2$ and is mathematically represented by:

$$<H^2 V^2> = C^2 K^2 I_1 I_2 \quad (13)$$

$$< <J_1^2> \sin^4\phi + <J_2^2> \sin^2\phi\cos^2\phi>$$

$$= \frac{C^2 K^2 I_1 I_2}{16}\{3\bar{J}_1^2 + \bar{J}_2^2\}$$

since $<\sin^4\phi> = \frac{3}{8}$ and $<\sin^2\phi \cos^2\phi> = \frac{1}{8}$ (14)

The output of multiplication means 265 and 266 are passed through a difference means 270 which provides the function of first multiplying the product of the averages of $H^2$ and $V^2$ provided by the output of multiplication means 265, and the average of the product of $H^2$ and $V^2$, the output of multiplication means 266, by appropriate weighting factors. The output of difference means 270 is an output signal indicative of the phase jitter and accordingly a signal indicative of the lock-in rate of the sensor as will be further explained.

As indicated in equations (9), (10), and (11), the ratio of the magnitudes of $J_1$ and $J_2$ remains the same in H, $H^2$, and the product of the averages of the lock-in modulation signal and the primary signal. On the other hand, the average of the product of $H^2$ and $V^2$, expressed in equation (13) produces an entirely different result. Namely, the ratio of $J_1$ and $J_2$ changes since $J_1$ and $J_2$ have different coefficients or multiplication factors compared with equations (9), (10), and (11). In the expression shown in equation (13), $J_1$ has three times the weight as $J_2$. This latter result, namely the average of the products produced by means 266 allows the discriminant signal to be obtained by appropriately differencing the product of the averages $<H^2>$ and $<V^2>$ subtracted from the average of the products of $H^2$ and $V^2$.

In order to produce the intended result, difference means 270 is shown including multipliers 271 and 272 in which multiplier 271 multiplies the output of multiplication means 265 by a factor of 3, and in which multiplier 272 multiplies the output of the averaging circuit 268 by a factor of 2. The output of each of the multipliers 271 and 272 is presented to a signal subtraction means 273 which essentially extracts the amplitude jitter contained in the average of the product of the squares so as to yield only $J_1^2$ which is representative of the phase jitter and accordingly representative of the lock-in rate.

With reference to FIGS. 1a and 1b, multiplying the squares of the primary signal and the lock-in modulation signal acts as a means for synchronously demodulating the amplitude jitter which is most significant at the minima and maxima of the primary signal. Accordingly this enhances the amplitude jitter over the phase jitter. On the other hand, the average of the lock-in modulation, $<H^2>$, is multiplied by $<V^2>$ for signal normalization. Differencing the synchronously demodulated amplitude jitter with lock-in modulation signal $<H^2>$ allows the extraction of phase jitter from the average of the lock-in modulation $<H^2>$. Note that Root Mean Squared (RMS) values are employed in the signal processing scheme shown in FIG. 2. However, the intended function may be provided by any means which can provide a signal indicative of the average of the peak amplitudes of signal H, RMS being just one example.

It is within the scope of the present invention that signal processing means 260 be an analog or digital apparatus which is capable of operating on the primary signal V and that provided by signal means 250 for providing the lock-in modulation signal H so that a signal indicative of the phase jitter can be realized. An alternative for signal processing means 260 shown in FIG. 2 may be one which employs the principles of selective timing windows instead of the synchronous demodulation approach as detailed in FIG. 2 for obtaining a signal indicative of phase jitter and corresponding lock-in rate. That is, by selectively weighting selected portions of the lock-in modulation signal corresponding to selected portions of the primary output signal, the phase jitter can be distinguished from the amplitude jitter as exemplified in FIGS. 1a and 1b. Thus, there are a variety of techniques for obtaining the appropriate phase jitter signal from the primary signal in combination with the lock-in modulation signal and are intended to be within the scope of the present invention.

In the foregoing description of the embodiment of the invention, the optical system was isolated from the laser structure by being rigidly attached to the base and provided an output signal having a phase signal component related to the phase difference and accordingly contained phase jitter. The principles of the present invention may also be practiced in a sensor system in which the optical system and detector is rigidly attached to the laser structure. Such a system is known as a block-mounted readout. When a block-mounted readout is employed, phase jitter is still present but is less discernible in the interference pattern compared with the interference pattern produced in a case-mounted readout.

Figure 3:
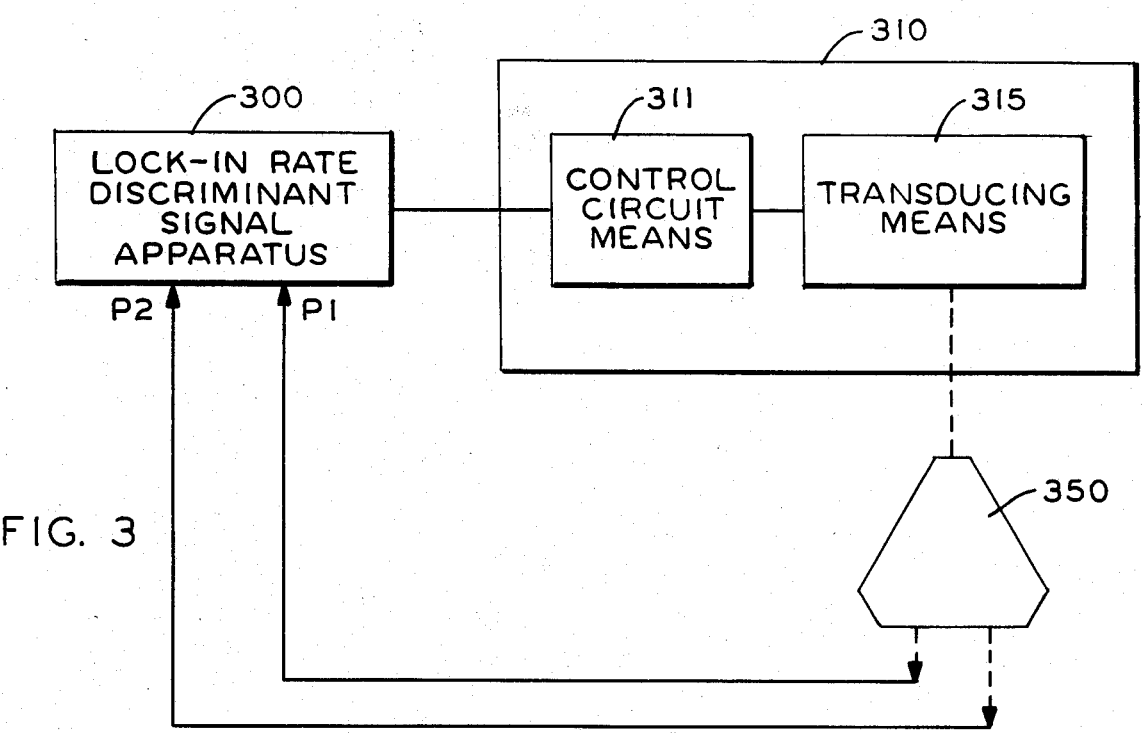
FIG. 3 is a block diagram showing the embodiment of that shown in FIG. 2 in combination with a closed-loop control system.

Shown in FIG. 3, is a closed-loop control system employing the discriminant generator of the present invention in a manner so as to minimize the lock-in rate of the sensor system. Shown in FIG. 3 is a simplified block diagram of a control system somewhat similar to that shown in U.S. Pat. No. 4,152,071. The lock-in rate discriminant signal apparatus as substantially shown and described in FIG. 2 is indicated by block 300 in FIG. 3 having an output signal D corresponding to the output of signal processing means 260 of FIG. 2. The lock-in rate discriminant signal is presented to control means 310 for altering the coupling of energy of the counter-propagating waves of a ring laser angular rate sensor shown as 350. Control means 310 is essentially a closed-loop control system somewhat similar to that shown in the aforementioned patent which provides a closed-loop system to obtain a minimum lock-in rate system.

Control means 310 comprises a circuit means 311 responsive to the discriminant signal provided by the lock-in rate discriminant signal apparatus 300 for providing an output signal 312 for controlling a ring laser transducing means 315. Transducing means 315 is any type of transducing means which can alter the coupling of energy of the counter-propagating waves of ring laser sensor 350. Ring laser transducing means 315 may be an apparatus for controlling one of the plurality of wave reflecting surfaces defining the optical closed-loop path. Any alteration of one of the wave reflecting surfaces, for example, tilting or translation, would alter the lasing path and hence alter the coupling of energy between the waves. Another example of ring laser transducing means may be that which can alter the lasing medium itself such as laser medium discharge currents which too, can alter the coupling of energy between the waves.

Circuit means 311 may be a variety of control circuits for generating an output control signal 312 for altering the sensor 350 in such a way so as to minimize the discriminant signal D. Circuit means is simply a control circuit for a negative feed control loop having input D and an output for controlling transducing means 315.

Obviously, many modifications and variations of the present invention are possible in light of the above teachings of the foregoing description of the embodiments of the invention shown in the accompanying drawings. It should be noted that the lock-in rate discriminant signal apparatus of the present invention may be employed in a variety of closed-loop control systems for altering the sensor in such a way so as to achieve minimum lock-in rate. It should also be noted that a variety of biasing techniques, closed-loop path configurations, and electromagnetic waves, are, of course, possible in practicing a ring laser angular rate sensor. It is, therefore, to be understood that within the scope of the depending claims the invention may be practiced otherwise as specifically described.

The embodiments of the invention in which an exclusive property or right is claimed are defined as follows:

1. An apparatus for providing a discriminant signal indicative of the lock-in rate of an angular rate sensor of the class wherein two waves propagate in opposite directions along a closed-loop path, wherein the frequency of each of said waves is a function of the rate of rotation of said closed-loop path, said waves establishing a phase difference therebetween, and wherein said lock-in rate is the rate of rotation of said sensor below which said frequency of said waves tend to lock-in to a common frequency, and said lock-in rate is related to the coupling of energy between each of the said waves traveling along said closed-loop path, the apparatus comprising:

signal means responsive to each of said waves for providing an output signal related to said phase difference between said waves, said output signal having phase and amplitude modulation components resulting substantially from energy coupling between said waves; and discriminant signal means for signal processing said signal means output signal to extract from said output signal a phase jitter signal representative of said phase modulation of said phase difference, said phase jitter signal providing said signal indicative of said lock-in rate.

2. The apparatus of claim 1 wherein said signal means includes:

an intensity detection means;

optical means for heterodyning a portion of each of said waves so as to produce an optical interference fringe pattern in which said fringe pattern varies as a function of rotation of said closed-loop path, said optical means capable of projecting said fringe pattern to impinge on said intensity detection means;

said intensity detection means capable of producing an output signal related to the intensity of said fringe pattern impinging thereon, said signal means output signal being related to said intensity detection means output signal.

3. The apparatus of claim 2 wherein said discriminant means includes:

modulation detector means responsive to said signal means output signal for providing an output signal representative of modulation of said intensity detection means output signal resulting substantially from the sum of said phase modulation and amplitude modulation of said waves.

4. The apparatus of claim 3 wherein said discriminant means further includes:

signal processing means responsive to said modulation detector means output signal and said signal means output signal for producing said phase jitter signal.

5. The apparatus of claim 4 wherein said signal processing means includes means for selectively weighting selected portions of said modulation detector means output signal corresponding to selected portions of said signal means output signal for distinguishing between said phase modulation and said amplitude modulation so as to provide said phase jitter signal.

6. The apparatus of claim 4 wherein said signal processing means includes demodulation means for demodulating said modulation detector means output signal thereby distinguishing between said phase modulation and said amplitude modulation so as to provide said phase jitter signal.

7. The apparatus of claim 4 wherein said signal processing means includes:

means responsive to said modulation detector means output signal for providing a modulation amplitude signal related to the average peak amplitude of said modulation detector means output signal;

means for providing a first product signal related to the product of said modulation detector means output signal and said signal means output signal;

comparing means responsive to said modulation amplitude signal and said first product signal for providing said signal indicative of said phase jitter.

8. The apparatus of claim 7 wherein said comparing means includes difference means for determining a difference signal related to the difference between said modulation amplitude signal and said first product signal for extracting said phase jitter signal.

9. The apparatus of claim 8 wherein said difference means includes means for scaling said modulation amplitude signal and said first product signal for extracting said phase jitter signal.

10. The apparatus of claim 4 wherein said signal processing means includes:

squaring means for providing a first signal related to the square of said modulation detector means output signal;

squaring means for providing a second signal related to the square of said signal means output signal;

means for providing a first product signal related to the product of said first and second signal;

averaging means for providing a first average signal related to the average of said first signal and providing a second average signal related to the average of said second signal;

means for providing a second product signal related to the product of said first average signal and said second average signal;

means for providing a third average signal related to the average of said first product signal;

difference means for determining a weighted difference between said third average signal and said second product signal, said weighted difference providing said phase jitter signal.

11. The apparatus of claims 2, 3, 8, or 10 wherein said angular rate sensor includes a biasing means for introducing a frequency bias in at least one of said waves so as to provide a frequency difference between said waves for at least a majority of the time.

12. The apparatus of claim 11 wherein said sensor includes:

a base means;

support means for providing said closed-loop path;

spring means for coupling said support means to said base means; and said signal means being rigidly coupled to said base means so that said interference fringe pattern varies at a rate proportional to common rotational motion of said base means and said support means but which includes intensity perturbations related to said phase difference between said waves produced by motion of said closed-loop path which is not common to said signal means.

13. An apparatus for minimizing the lock-in rate of an angular rate sensor of the class wherein two waves propagate in opposite directions along a closed-loop path, wherein the frequency of each of said waves is a function of the rate of rotation of said closed-loop path, said waves establishing a phase difference therebetween, and wherein said lock-in rate is the rate of rotation of said sensor below which said frequency of said waves tend to lock-in to a common frequency, and said lock-in rate is related to the coupling of energy between each of the said waves traveling along said closed-loop path, the apparatus comprising:

signal means responsive to each of said waves for providing an output signal related to said phase difference between said waves, said output signal having phase and amplitude modulation components resulting substantially from energy coupling between said waves; and discriminant signal means for signal processing said signal means output signal to extract from said output signal a phase jitter signal representative of said phase modulation of said phase difference; and control means responsive to said phase jitter signal for altering said closed-loop path to a condition at which said lock-in rate is at a minimum.

14. The apparatus of claim 13 wherein said signal means includes:

an intensity detection means;

optical means for heterodyning a portion of each of said waves so as to produce an optical interference fringe pattern in which said fringe pattern varies as a function of rotation of said closed-loop path, said optical means capable of projecting said fringe pattern to impinge on said intensity detection means;

said intensity detection means capable of producing an output signal related to the intensity of said fringe pattern impinging thereon, said signal means output signal being related to said intensity detection means output signal.

15. The apparatus of claim 14 wherein said discriminant means includes:

modulation detector means responsive to said signal means output signal for providing an output signal representative of modulation of said intensity detection means output signal resulting substantially from the sum of said phase modulation and amplitude modulation of said waves.

16. The apparatus of claim 15 wherein said discriminant means further includes:

signal processing means responsive to said modulation detector means output signal and said signal means output signal for producing said phase jitter signal.

17. The apparatus of claim 16 wherein said signal processing means includes means for selectively weighting selected portions of said modulation detector means output signal corresponding to selected portions of said signal means output signal for distinguishing between said phase modulation and said amplitude modulation so as to provide said phase jitter signal.

18. The apparatus of claim 16 wherein said signal processing means includes demodulation means for demodulating said modulation detector means output signal thereby distinguishing between said phase modulation and said amplitude modulation so as to provide said phase jitter signal.

19. The apparatus of claim 16 wherein said signal processing means includes:

means responsive to said modulation detector means output signal for providing a modulation amplitude signal related to the average peak amplitude of said modulation detector means output signal;

means for providing a first product signal related to the product of said modulation detector means output signal and said signal means output signal;

comparing means responsive to said modulation amplitude signal and said first product signal for providing said signal indicative of said phase jitter.

20. The apparatus of claim 19 wherein said comparing means includes difference means for determining a difference signal related to the difference between said modlation amplitude signal and said first product signal for extracting said phase jitter signal.

21. The apparatus of claim 20 wherein said difference means includes means for scaling said modulation amplitude signal and said first product signal for extracting said phase jitter signal.

22. The apparatus of claim 15 wherein said signal processing means includes:
- squaring means for providing a first signal related to the square of said modulation detector means output signal;
- squaring means for providing a second signal related to the square of said signal means output signal;
- means for providing a first product signal related to the product of said first and second signal;
- averaging means for providing a first average signal related to the average of said first signal and providing a second average signal related to the average of said second signal;
- means for providing a second product signal related to the product of said first average signal and said second average signal;
- means for providing a third average signal related to the average of said first product signal;
- difference means for determining a weighted difference between said third average signal and said second product signal, said weighted difference providing said phase jitter signal.

23. The apparatus of claims 14, 15, 20, or 22 wherein said angular rate sensor includes a biasing means for introducing a frequency bias in at least one of said waves so as to provide a frequency difference between said waves for at least a majority of the time.

24. The apparatus of claim 23 wherein said sensor includes:
- a base means;
- support means for providing said closed-loop path;
- spring means for coupling said support means to said base means; and
- said signal means being rigidly coupled to said base means so that said interference fringe pattern varies at a rate proportional to common rotational motion of said base means and said support means but which includes intensity perturbations related to said phase difference between said waves produced by motion of said closed-loop path which is not common to said signal means.

25. The apparatus of claims 2, 3, 4, 5, 6, 7, 8, 9, 10, 14, 15, 16, 17, 18, 19, 20, 21, or 22 wherein said intensity detection means includes:
- first and second photodetectors for providing first and second intensity signals indicative of the intensity of a portion of said interference pattern, said first and second photodetectors being spatially separated so that said first and second intensity signals are phase separated;
- equalizing means responsive to said first and second intensity signals for providing first and second equalized intensity signals, related to said first and second intensity signals respectively, having substantially equal peak amplitudes; and
- difference means for providing an intensity difference signal directly related to the difference between said first and second equalized intensity signals, said signal means output signal being a function of said intensity difference signal.

* * * * *